United States Patent [19]

Bauer et al.

[11] 4,325,350
[45] Apr. 20, 1982

[54] ALTERNATOR-POWERED BREAKERLESS CAPACITOR DISCHARGE IGNITION SYSTEM HAVING IMPROVED LOW-SPEED TIMING CHARACTERISTICS

[75] Inventors: Michael E. Bauer; Richard L. Sleder, both of Fond du Lac, Wis.

[73] Assignee: Brunswick Corporation, Skokie, Ill.

[21] Appl. No.: 98,070

[22] Filed: Nov. 28, 1979

[51] Int. Cl.³ .............................................. F02P 1/02
[52] U.S. Cl. .................................. 123/605; 123/603; 123/633; 123/599
[58] Field of Search .............. 123/599, 603, 605, 631, 123/633, 648; 315/209 CD, 209 SC

[56] References Cited

U.S. PATENT DOCUMENTS

| | | | |
|---|---|---|---|
| 3,715,650 | 2/1973 | Draxler | 123/599 |
| 3,747,582 | 7/1973 | Kato | 123/599 |
| 3,805,759 | 4/1974 | Fitzner | 123/599 |
| 3,911,886 | 10/1975 | Nagasawa | 123/599 |
| 4,007,724 | 2/1977 | Mura | 123/599 |
| 4,054,113 | 10/1977 | Sleder et al. | 123/599 |
| 4,160,435 | 7/1979 | Sleder | 123/599 |
| 4,200,078 | 4/1980 | Cavil et al. | 123/605 |

FOREIGN PATENT DOCUMENTS 1442787 7/1976 United Kingdom .

Primary Examiner—P. S. Lall

[57] ABSTRACT

An alternator-powered breakerless capacitor discharge ignition system for an alternate firing two-cylinder outboard motor provides improved timing characteristics at low, as well as high, engine speeds and prevents reverse engine rotation. The alternator rotor and stator assemblies define a first magnetic circuit which provides constant polarity, constant power pulses for charging a single capacitor in the system. The alternator rotor and trigger assemblies define a second magnetic circuit which provides synchronized narrow trigger pulses, successive one's being of opposite polarity, to operate an electronic control circuit to effect timed capacitor discharge to a pair of spark plug ignition coils in the system. The first magnetic circuit includes a pair of relatively narrow ceramic permanent magnets spaced 180° apart on the alternator rotor flywheel for energizing series-connected, oppositely wound, spaced apart low-speed and high speed stationary windings in the stator assembly. The second magnetic circuit includes a two-pole magnetic strip on the flywheel hub for energizing an adjustably positionable (advance/retard) specially designed trigger coil in the trigger assembly. The low speed winding, the capacitor, and the ignition coils each have one side grounded to reduce system wiring complexity and cost.

5 Claims, 8 Drawing Figures

ALTERNATOR-POWERED BREAKERLESS CAPACITOR DISCHARGE IGNITION SYSTEM HAVING IMPROVED LOW-SPEED TIMING CHARACTERISTICS

DESCRIPTION

TECHNICAL FIELD

This invention relates generally to alternator-powered breakerless capacitor discharge ignition systems for internal combustion engines, such as two-cylinder outboard motors or the like. In particular, it relates to improved alternators and electronic control circuits in such ignition systems.

BACKGROUND ART

An alternator-powered breakerless capacitor discharge ignition system for an alternate firing two-cylinder internal combustion engine, such as an outboard motor, typically includes an alternator having a rotor including permanent magnets and stationarily mounted capacitor charging and trigger coils, capacitors, a control circuit and a pair of ignition coils for the engine spark plugs, each connectible to a respective capacitor for timed firing by means of the control circuit. U.S. Pat. No. 4,160,435, owned by the same assignee as the present application discloses such an ignition system. Such prior art systems employs magnetic circuit arrangements in the alternator which are of such a nature that the time for capacitor charging is relatively long and the trigger pulses for firing the capacitors occur within a relatively wide angular distance of engine crankshaft rotation. As a result, engine timing characteristics at low engine speeds leave much to be desired. Some such prior art systems also permit, under certain circumstances, undesirable reverse rotation of the engine. In addition, electrical wiring and circuitry is more redundant, complex and costly than is desirable.

DISCLOSURE OF INVENTION

In accordance with the present invention there is provided an alternator-powered breakerless capacitor outboard motor which provides improved timing characteristics at low, as well as high, engine speeds and prevents reverse engine rotation. The system includes an alternator, a single capacitor, an electronic control circuit, and a pair of ignition coils for the engine spark plugs. The alternator includes a rotor assembly, a stator assembly and a trigger assembly. The alternator rotor and stator assemblies define a first magnetic circuit which provides constant polarity, constant power pulses for charging the capacitor. The alternator rotor and trigger assemblies define a second magnetic circuit which provides synchronized narrow trigger pulses, successive one's being of opposite polarity, to operate the electronic control circuit to effect timed capacitor discharge to the ignition coils. The first magnetic circuit includes a pair of relatively narrow ceramic permanent magnets spaced 180° apart on the rotor assembly flywheel for energizing series-connected, oppositely wound, spaced apart low-speed and high-speed stationary windings in the stator assembly. The second magnetic circuit includes a two-pole magnetic strip on the flywheel hub for energizing an adjustably positionable (advance/retard) specially designed trigger coil in the trigger assembly. The low speed winding, the capacitor, and the ignition coils each have one side grounded to reduce system wiring complexity and cost.

More specifically, the low speed winding has one side connected to ground and has its other side connected to one side of the capacitor through a diode. The other side of the capacitor is grounded. The high speed winging has both sides connected through diodes to the said one side of the capacitor. The trigger coil has its opposite sides connected to two firing sections in the electronic control circuit, and each of the latter firing sections is connected to the capacitor and to one side of the primary winding of a respective ignition coil or pulse transformer. The other side of each ignition coil primary winding is grounded.

The capacitor receives charging pulses from both the low speed and high speed windings with the proportion dependent on engine speed. The electronic control circuit receives trigger pulses from the trigger coil and causes the capacitor to discharge to the appropriate ignition coil.

The electronic control circuit is responsive to the polarity of the pulses from the trigger coil to connect one or the other ignition coil to the capacitor, whereby the ignition coils are alternatively energized and fired. The magnetic and electronic circuits are responsive to reverse rotation of alternator magnets to cause reverse polarity of the trigger pulses by 180°, thereby preventing timely firing of the ignition coils and preventing the engine from running in reverse.

The magnetic and electronic circuits are so connected and arranged that rise time for charging the capacitor is very high and so that the trigger pulse is very narrow, thereby providing improved ignition timing, especially at relatively low engine speeds.

An ignition system in accordance with the present invention provides several advantages over the prior art. For example, the ignition system, which operates over a flywheel angular speed of 100 to 8,000 r.p.m, provides for ignition firing, i.e., triggering, at low engine speeds which is substantially improved over prior art systems, since the rise time for firing the capacitor is reduced from 18° of crankshaft rotation, for example, to a much narrower range on the order of 9° and narrower triggering pulses can be employed to effect capacitor discharge. In tests of an actual embodiment, wherein a flywheel angular speed of 500 r.p.m was used as a zero reference, the ignition occurrence angle did not retard more than 0.5° when speed was reduced to 200 r.p.m., did not retard more than 1.5° when speed was reduced to 100 r.p.m., did not change more than 3° when speed was increased to 6,000 r.p.m., and did not change more than 5° as speed increased to 8,000 r.p.m. Also, no voltage was present at one spark plug terminal when the other was being fired.

Furthermore, the ignition system effects a 180° reversal in ignition firing if engine rotation reverses, thereby preventing reverse operation of the engine.

The ignition system in accordance with the invention, although embodying substantial improvements over the prior art is relatively simple in construction and is at least as economical to manufacture than prior art systems which it improves upon.

Other objects and advantages will hereinafter appear.

BEST MODE FOR CARRYING OUT THE INVENTION

Figure 1:
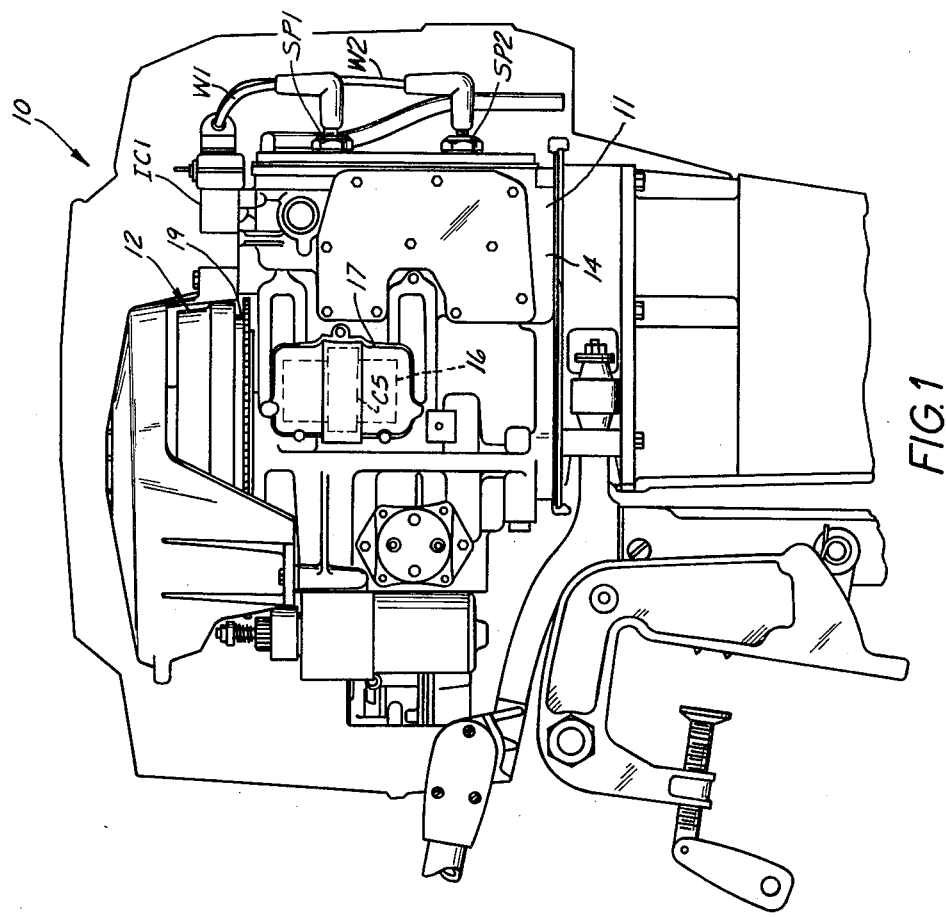
FIG. 1 is a side elevational view, with portions broken away, of an outboard motor having a two cylinder engine and an alternator-powered breakerless capacitor discharge ignition system in accordance with the present invention.

FIG. 1 shows an outboard motor 10 which is provided with an alternator driven breakerless capacitor discharge ignition system in accordance with the invention. Outboard motor 10 includes an internal combustion engine 11 which, for example, takes the form of a two-cylinder alternately firing two-cycle gasoline engine. Engine 11, which is provided with a pair of alternately firing spark plugs SP1 and SP2, one for each cylinder, includes a rotatable crankshaft or drive shaft 13, shown in FIGS. 2 and 3, which extends upwardly through the top of the stationary engine block 14.

Outboard motor 10 further includes an alternator 12 which is located on top of engine 11 beneath a stationary cover 15 secured to engine block 14. Alternator 12, which is connected to be driven by the crankshaft 13 of engine 11, is part of the ignition system and is hereafter described in detail.

The ignition system includes alternator 12, an electronic control circuit 16 (See FIG. 4) located within a housing 17 mounted on engine 11, a single capacitor C5 also located in housing 17, and a pair of pulse transformers or ignition coils IC1 and IC2, which are connected to the two spark plugs SP1 and SP2, respectively, by two ignition wires W1 and W2, respectively. The ignition coils IC1 and IC2 are electrically connected to electronic control circuit 16 through electrical conductors L1 and L2 which are not shown. The ignition system operates to effect alternate firing of the spark plugs SP1 and SP2 of the two cylinders of engine 11 when the engine is running.

Figure 2:
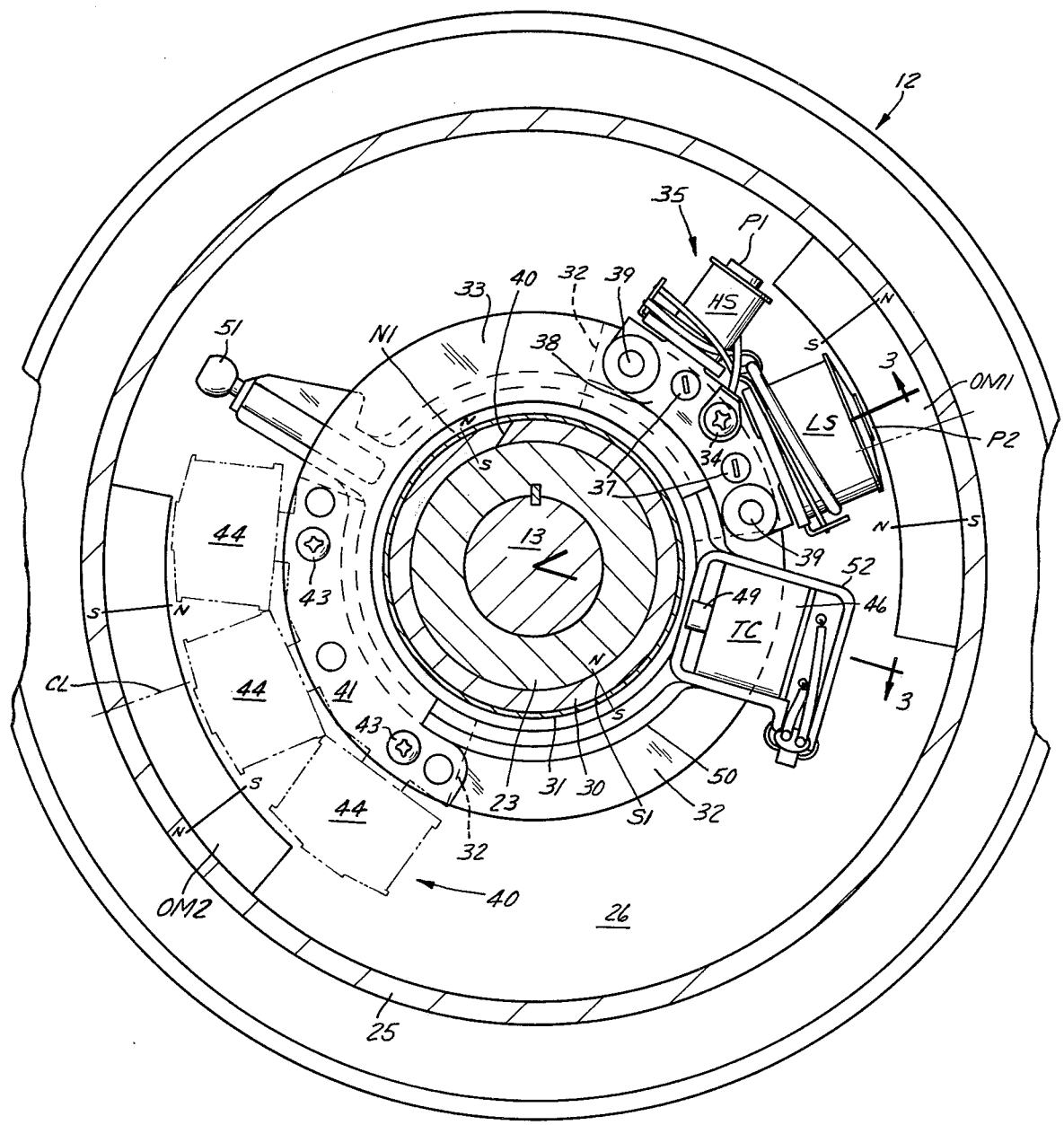
FIG. 2 is an enlarged, top plan view, partly in cross-section, and with portions broken away, of the alternator of FIG. 1.
Figure 3:
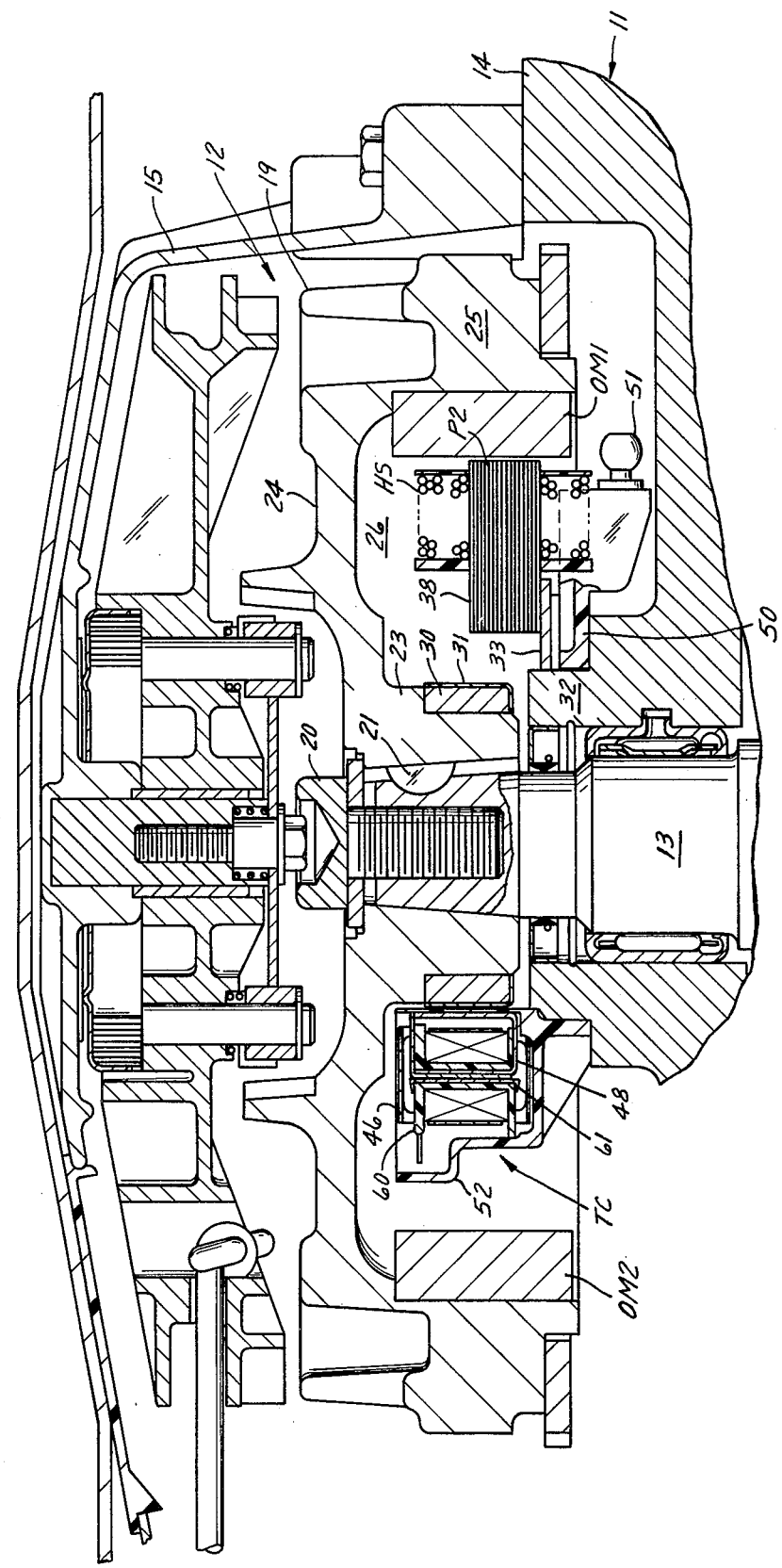
FIG. 3 is a cross-sectional view of the alternator taken on line 3—3 of FIG. 2.
Figure 5:
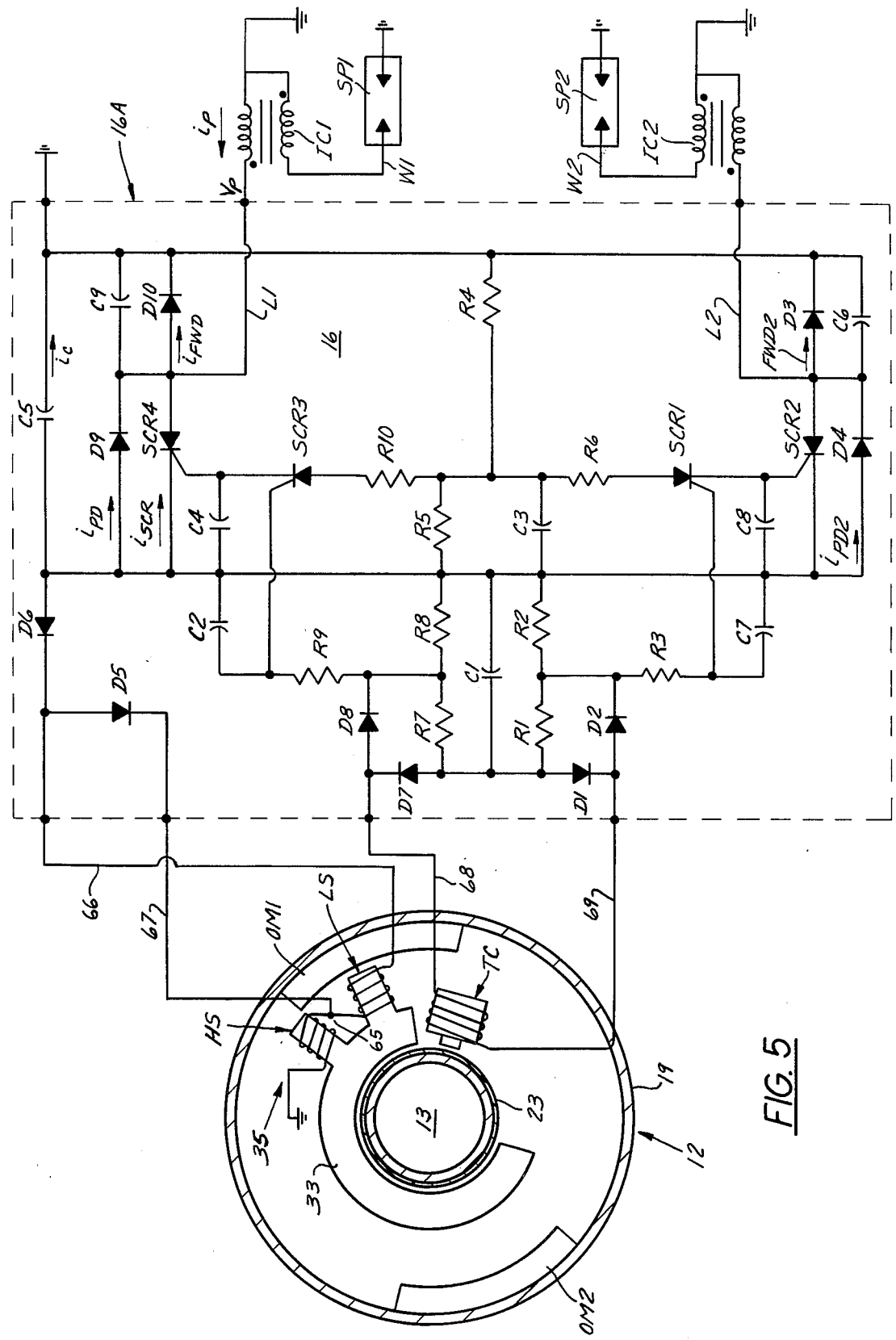
FIG. 5 is an electrical circuit diagram of an ignition system in accordance with the invention.
Figure 8:
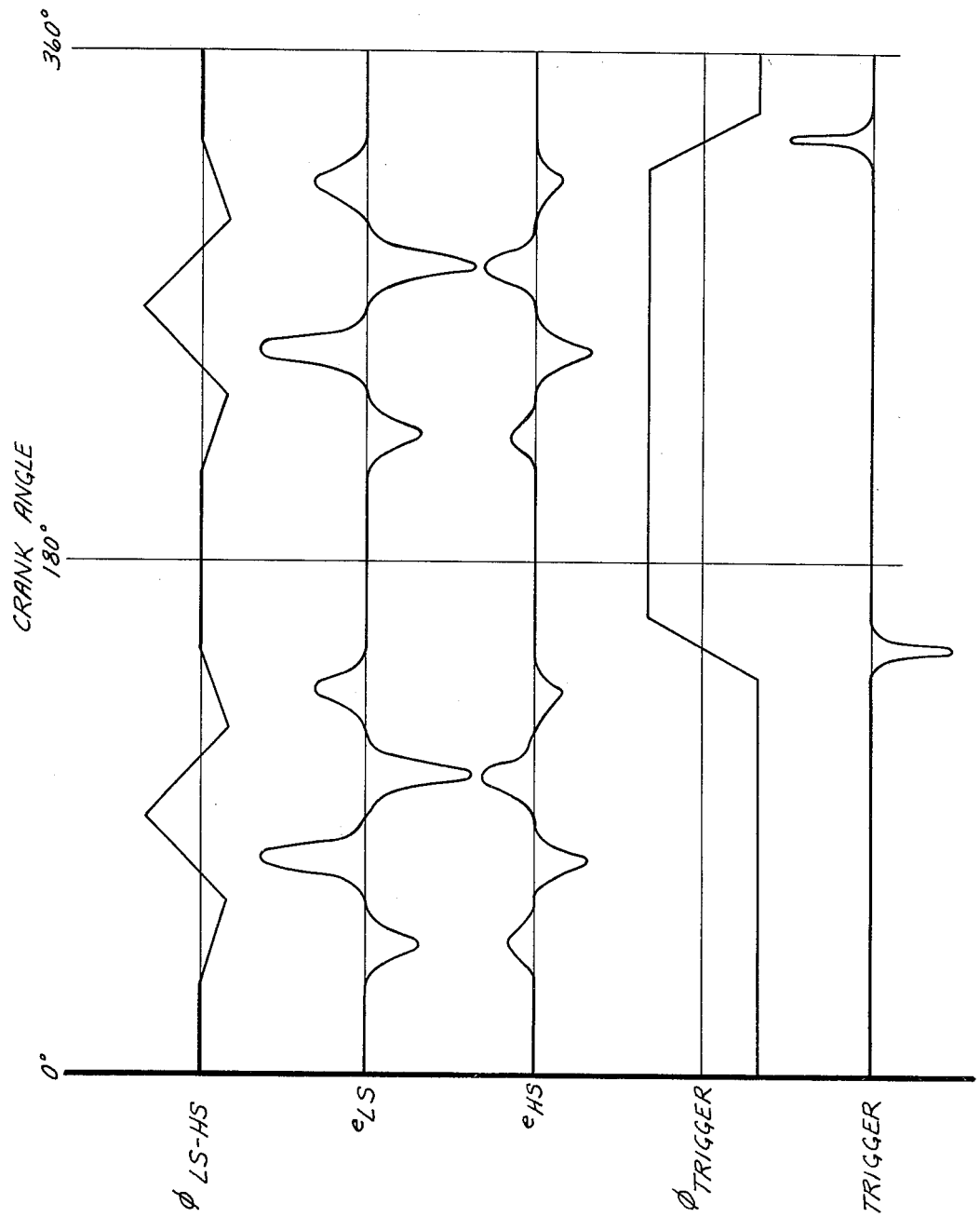
FIG. 8 is a graphical depiction of electrical wave forms occurring in the ignition system of the invention during operation.

Referring to FIGS. 2, 3, and 5, alternator 12 generally comprises a rotor assembly, a stator assembly and a trigger assembly.

The rotor assembly includes a flywheel 19 which is secured to the end of crankshaft 13 for rotation therewith by means of a bolt 20 and a key 21. Flywheel 19, which is formed of magnetically permeable steel and generally circular in shape, comprises an inner hub portion 23 which is connected by a web-like portion 24 to a downwardly depending annular outer peripheral portion 25 and an annular recess or space 26 is provided beneath portion 24 to accommodate components. The rotor assembly further includes a pair of outer magnets OM1 and OM2 secured as by gluing to a peripheral portion 25 of flywheel 19 within recess 26 and a magnetic strip 30 secured to hub portion 23 by means of a steel cup 31. Flywheel 19 is part of the magnetic circuit of the stator and trigger assemblies and also supports, protects and imparts motion to certain system components.

The stator assembly includes a support bracket 33, arcuate in form, which is stationarily mounted on a cylindrical portion 32 of engine block 14 by screws 34 and supports a stator coil assembly 35, including a low speed coil LS and a high speed coil HS, which is secured thereto by screws 39. Support bracket 33 is further adapted to support an optionally usable power coil assembly 40, shown in FIG. 2, which includes a laminated multipole core 41 secured thereto by screws 43 and on which three power coils 44 are mounted.

The trigger assembly includes a plastic (generally non-conductive) support bracket 50, generally annular in form and having an adjusting lever 51 on one side and a coil receiving housing 52 on the opposite side. Bracket 50 is movably mounted on cylindrical portion 32 of engine block 14 and is rotatably shiftable thereon relative to crankshaft 13 by lever 51 between spark advance/retard positions. Housing 52 of bracket 50 supports a trigger coil assembly which includes a voltage generating trigger coil TC.

As hereinafter explained in detail, the alternator rotor and stator assemblies define a first magnetic circuit which provides constant polarity, constant power pulses for charging single capacitor C5. The alternator rotor and trigger assemblies define a second magnetic circuit which provides synchronized narrow trigger pulses, successive one's being of opposite polarity, to operate electronic control circuit 16 to effect timed alternative capacitor discharge to the pair of spark plug ignition coils IC1 and IC2.

One (the outer) magnetic circuit is provided for charging capacitor C5 and includes the pair of outer permanent magnets OM1, OM2 each 60° wide, spaced 180° apart from each other on the inner side of the peripheral portion 25 of flywheel 19 of the alternator rotor for energizing the stationarily mounted charging coil assembly 35 which is part of the stator assembly. The stator assembly 35 comprises low-speed winding LS and high speed winding HS which are series connected in opposition to each other and have laminated magnetic cores or poles P1 and P2, respectively, which are spaced 30° apart from each other. The cores or poles P1 and P2 are formed by rigidly interconnected common laminations 38 and the latter are rigidly secured as by rivets 37 to stator ring 33. The outer magnetic circuit is also usable to provide auxiliary electrical power by means of its cooperation with the power coils 44 shown in FIG. 2. The other (inner) magnetic circuit is provided for operating or triggering the electronic control circuit 35 to trigger capacitor C5 and includes the permanent magnet strip 30 having a polar axis along which its pair of magnet poles N1, L1 lie, being spaced 180° apart from each other on or near hub 23 of flywheel 19 of the alternator rotor and the adjustable (advance/retard) specially designed trigger coil assembly. The low speed winding LS, the capacitor C5, and the ignition coils IC1 and IC2 each have one side grounded, as FIG. 5 shows.

The two magnets OM1 and OM2 take the form of two 60° ceramic magnets of arcuate shape which are secured, as by being glued to the inside surface of portion 25 of the flywheel 19 with 3 M 2214 structural adhesive. The permanent strip 30 magnet takes the form of plastiform permanent magnet strip which is wrapped around the outside of the flywheel hub 30. The plastiform magnet strip 30 is coiled and pressed into a stainless steel cup 31 and this assembly is then pressed onto the flywheel hub 23. The resulting interference fit eliminates the need for any adhesive. The joint 40 of the plastiform strip 30 is located 90° from the centerline CL of the two ceramic magnets OM1 and OM2. During assembly of flywheel 19, the ceramic magnets OM1 and OM2 are magnetized so that each magnet has a north pole N and a south pole S on its face, as FIG. 2 shows. The magnet strip 30 is magnetized such that the two poles N1 and S1 span 180°. The neutral zones of the magnet strip 30 are in direct line with the neutral zones of the outer ceramic magnets 0M1 and OM2, as FIG. 2 shows.

The stator assembly, which includes support bracket 33, is rigidly attached to the top of block 14 of engine 11 so that the flywheel 19 rotates thereabout with a nominal air gap of 0.035" between the ceramic magnets OM1, OM2 and the poles P1, P2 of the stator charging coil assembly 35. The stator assembly includes the two series-connected opposing windings HS and LS which are disposed on the laminated steel poles P1 and P2, which are spaced 30° apart from each other. The differences in the pole areas, coil inductance, coil resistance, coil turns, and diode switching in the electronic circuit 16 result in an almost constant energy production during engine operations from 300 to 6,000 r.p.m.

Figure 4:
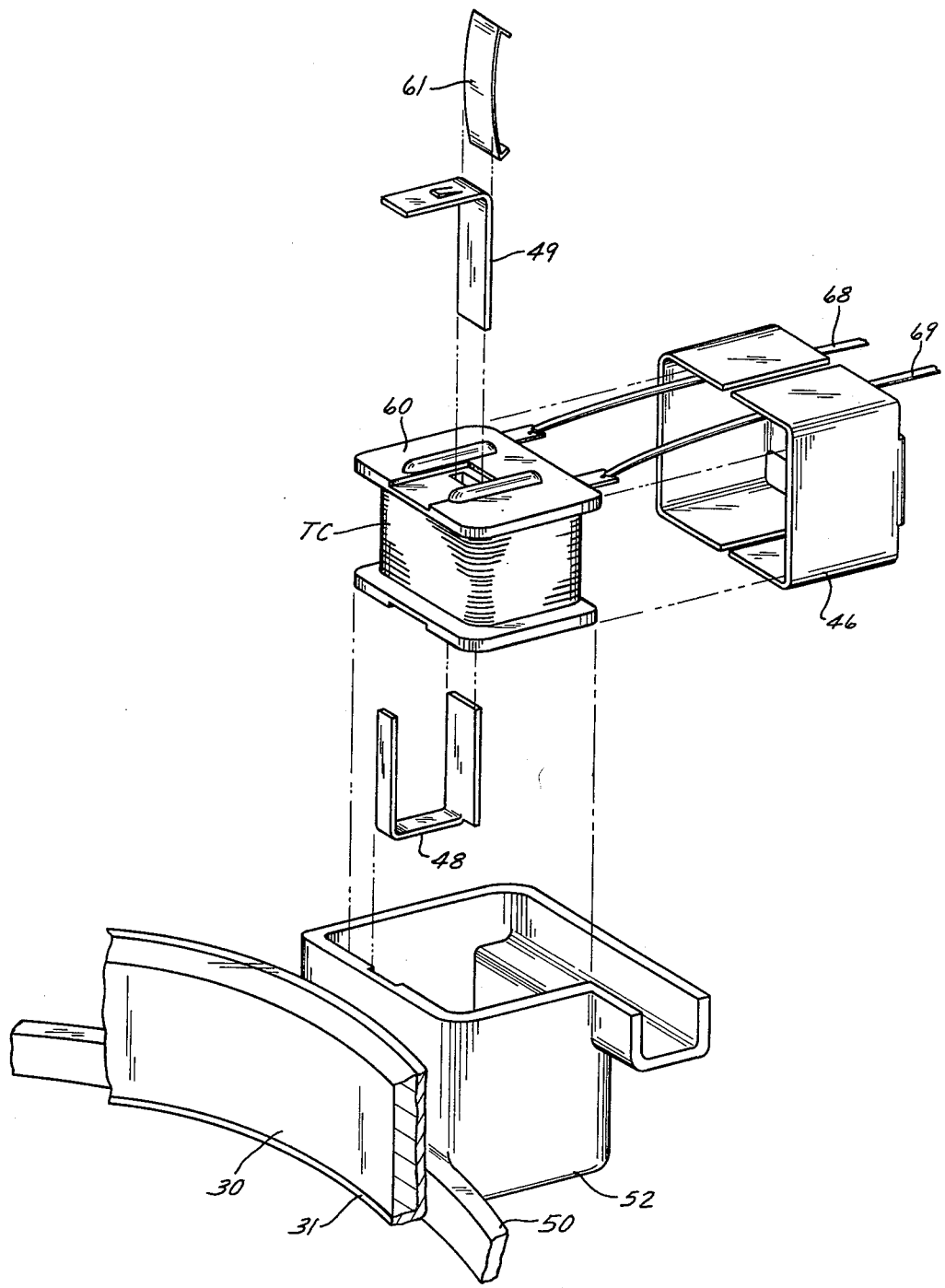
FIG. 4 is an enlarged, perspective, exploded view of the trigger assembly shown in FIGS. 2 and 3.

As FIGS. 2, 3 and 4 best show, the trigger assembly is mounted on the top of block 14 of engine 11 so that it is free to be adjustably rotated around the flywheel hub 23 between fully retarded and fully advanced timing positions. The trigger assembly position and, therefore, spark timing is determined by the position of the throttle (not shown) of engine 11 via a mehanical linkage (not shown). The trigger assembly, which includes the support bracket 50, plastic housing 52, voltage generating trigger coil TC, further includes a magnetic shield 46 and two pole pieces 48 and 49. The U-shaped pole piece 48 facing the magnet strip 30 collects the flux and routes it through the coil TC. The L-shaped top pole piece 49 returns the flux to the flywheel 19. The flywheel 19 then completes the magnetic circuit to the back of the magnet strip 30. There is a nominal air gap of 0.031" between the magnet cup 31 and the plastic housing 52. The air gap has a greater effect on the top pole piece 49 because of its smaller area as compared to the bottom pole piece 48 that faces the magnet 30. The magnetic shield 46 is required to shunt the strong magnetic field from the outer ceramic magnets OM1 and OM2 to the flywheel 19 to obtain symmetrical timing.

The narrow pulses produced by the trigger coil assembly result in better timing characteristics, at engine idle speeds and trigger pulse rise time (10% to 90%) takes place within 10 crankshaft degrees. This is accomplished by using a narrow pole 48 in coil TC to sense the flux transitions and a wider flux return pole 49 to complete the path back to the flywheel 19. With this system, rise times of 7 to 10 crankshaft degrees were recorded during actual tests. Noise from the outer magnet leakage flux is prevented from appearing in the trigger circuit by means of magnetic shield 46, which takes the form of a folded cold rolled sheet steel box which surrounds the trigger coil TC on five sides. The pole pieces 48 and 49 are pressed into the bobbin assembly 60 on which coil TC is wound and assembly 60 is placed inside the shield 46. Protrusions molded into the bobbin assembly center it inside the shield 46. To prevent the bottom pole 48 from dropping out of position and touching the shield 46, which condition would result in the loss of shielding action, a spring clip 61 is provided to hold the pole pieces 48 and 49 more securely. Since the top pole piece 49 returns the flux back to the flywheel 19 to complete the magnetic circuit, this pole can touch the trigger shield 46, since the function of the shield 46 is also to return flux to the flywheel 19.

Figure 6:
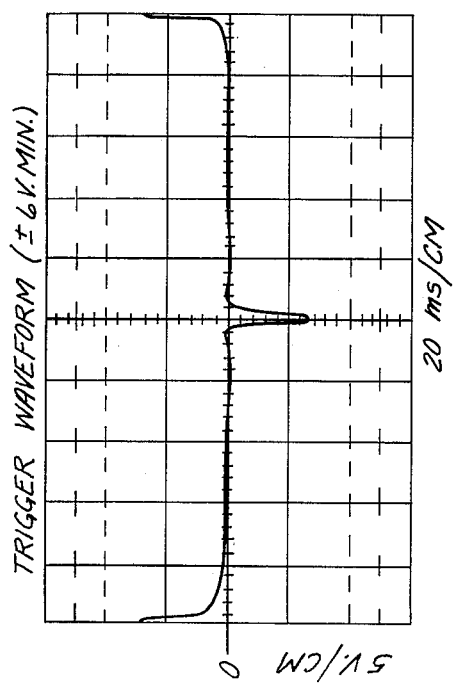
FIGS. 6 and 7 are graphical depictions of electrical output signals of the alternator shown in FIGS. 1 through 4.
Figure 7:
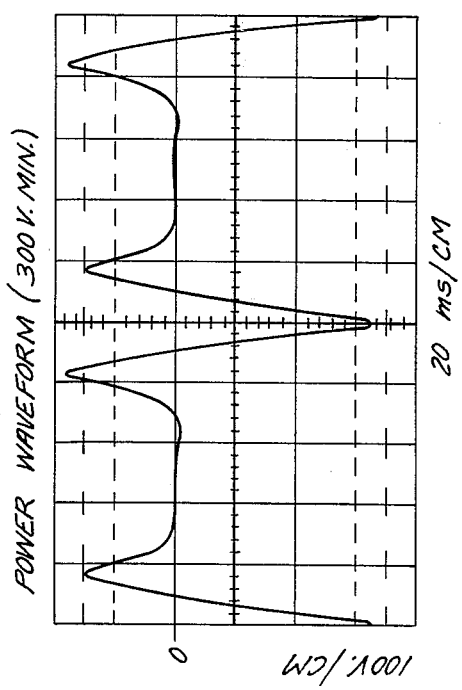

The alternator 12 generally operates as follows. As previously explained, the rotor assembly includes flywheel 19 which is rigidly attached to the top end of the engine crankshaft 13. During rotation, as each ceramic magnet OM1, OM2 passes the stator coils HS and LS, four flux transitions occur. Therefore, each of the stator coils HS and LS generates four voltage pulses. The negative pulses charge up the energy storage capacitor C5 through the charging diodes D5 and D6 of circuit 16. At low speeds, the low speed coil LS does most of the charging. At high speed, the low speed coil LS has too high an impedance to fully charge the capacitor C5. Therefore, at high speeds, the high speed coil HS does most of the charging. With the proper coil combination, an almost constant energy supply is made available to each ignition coil IC1, IC2, in the engine speed range from 300 to 6,000 r.p.m. Sometime after the energy storage capacitor C5 is charged, the trigger coil TC sees a flux transition and generates a voltage pulse. As the graphs in FIGS. 5, 6 and 7 show, a positive pulse fires the spark plug for one cylinder, and subsequently a negative pulse fires the other spark plug for the other cylinder. If the flywheel 19 is spun backwards, the trigger pulses from coil TC change polarity. This changes the engine timing 180° and engine 11 will not run. The trigger coil position and, therefore, advance/retard engine timing is determined by the position of the engine throttle (not shown). The trigger pulses from coil TC can never occur while the stator windings HS and LS are charging the energy storage capacitor C5, because of the mechanical arrangement disclosed. The idealized waveforms of FIG. 7 depict the above-described operation of alternator 12.

Referring to FIGS. 5, 6, 7 and 8, the following description explains the construction of circuit 16 and explains its operation as the flywheel 19 rotates through one complete revolution.

As FIG. 5 shows, the components of electronic circuit 16 are preferably mounted on a printed circuit board 16A, with the exception of capacitor C5. It is to be understood that the printed circuit is laid out so that most of the components can be automatically inserted, wave soldered, tested and debugged, prior to final assembly, whereupon the circuit board assembly is pressed into a plastic potting shell and encapsulated using a polyurethane material.

As FIG. 5 shows one side of coil HS is grounded and the other side is connected at point 65 to one side of coil LS. The other side of coil LS is connected by a conductor 66 through a diode D6 to one side of capacitor C5. The other side of capacitor C5 is grounded. Point 65 is connected by a conductor 67 through a diode D5 to diode D6.

One side of coil TC is connected by a conductor 68 to one portion of circuit 16 which effects discharge of capacitor C5 to the primary winding of ignition coil IC1. The other side of coil TC is connected by a conductor 69 to the other portion of circuit 16 which effects discharge of capacitor C5 to the primary winding of ignition coil IC2.

Circuit operation is hereinafter described with reference to the components shown in FIG. 5 and the specific function of these components is then subsequently described.

Because of the mechanical arrangement, the stator coil assembly 35 sees the flux transitions before the trigger coil TC sees its flux transition. When the output of the low speed coil LS goes negative with respect to ground (see FIGS. 6 and 7), current flows through diode D6, the coil LS, the coil HS, and ground to charge capacitor C5. When the coil HS output goes negative, current flows through diodes D6, D5, the coil HS and ground to charge capacitor C5. Diode D5 is used to bypass the LS coil during capacitor charging, since the coil has too high of an impedance to sufficiently charge capacitor C5 at high speeds. At low speeds, the coil LS, with its higher available voltage, does most of the charging. During the charging of capacitor C5, all of the four controlled rectifiers SCR's 1, 2, 3, 4 are off. This allows capacitor C3 to charge at a rate and to a voltage that is determined by the combination of resistors R4 and R5.

As the flywheel 19 continues to rotate, the trigger coil TC sees its flux transition. If conductor 68 is positive with respect to conductor 69, current will flow into the conductor 68.

Current will flow through diode D8, resistor R9, the parallel series combination of capacitor C2, the gate to cathode junction of controlled rectifier SCR3, capacitor C4 and the gate to cathode junction of SCR4; the parallel combination of resistors R7 and R8, resistors R1 and R2, and capactor C1; diode D1, and back to the trigger coil TC. The current flow turns on controlled rectifier SCR3, but the current level is too low to turn on controlled rectifier SCR4. Controlled rectifier SCR3 is forward biased by capacitor C3 and capacitor C3 discharges through resistor R10, controlled rectifier SCR3, and the parallel combination of capacitor C4 and the gate to cathode junction of controlled rectifier SCR4. Capacitor C3 and resistor R10 are selected such that the current discharge pulse is ideal for the turn on of controlled rectifier SCR4 under high di/dt conditions. Controlled rectifier SCR4 will turn on hard, and capacitor C5 will discharge through the anode to cathode junction of controlled rectifier SCR4 and the primary of ignition coil IC1. This discharge is a high amplitude current pulse of short duration. This causes a fast rising voltage to appear in the secondary winding of the ignition coil IC1. This pulse is of sufficient amplitude to ionize the spark gap and provide ignition to cylinder 1 of engine 11. With capacitors C3 and C5 fully discharged, the current through the controlled rectifiers SCR3 and SCR4 will go to zero and the controlled rectifiers will return to their non-conducting state.

As the flywheel 19 continues to rotate, the stator coil assembly 35 and coil TC will see the flux transitions from the other ceramic magnet. This will charge up capacitors C5 and C3 the same as before. Sometime later, the trigger coil TC will see its flux transition and will produce an output pulse. This pulse will be of the opposite polarity and current will flow into the conductor 69. The current will flow through diode D2, resistor R3, the parallel series combination of capacitor C7, the gate to cathode junction of controlled rectifier SCR1, capacitor C8, and the gate to cathode junction of controlled rectifier SCR2; the parallel combination of resistors R1 and R2, resistors R7 and R8, and capacitor C3; diode D7 and out the conductor 68. This will turn on controlled rectifier SCR1 and capacitor C3 will discharge through resistor R6, the anode to cathode junction of controlled rectifier SCR1, and the parallel combination of capacitor C8, and the gate to cathode junction of controlled rectifier SCR2. This will cause controlled rectifier SCR2 to turn on and discharge capacitor C5 through ignition coil IC2. This will result in the ignition of the cylinder 2 of engine 11. With capacitor C5 and capacitor C3 discharged, the controlled rectifier SCR1 and SCR2 will return to their non-conducting state.

This completes one revolution of the flywheel and the above sequence is repeated.

In reference to the specific function of the components shown in FIG. 5, the parallel combination of resistors R1 and R2, resistors R7 and R8 and capacitor C1 form a trigger self-bias network. Since capacitor C1 is charged everytime a trigger pulse is generated by coil TC and discharged at a constant rate determined by resistors R1 and R2 in parallel with resistors R7 and R8, a D.C. voltage appears across capacitor C1 that is proportional to the engine speed. The voltage on capacitor C1 opposes the trigger voltage pulse. Therefore, as the speed of the engine 11 increases, higher voltage trigger pulses are required, since the output of the trigger coil TC is also proportional to engine speed, the effects tend to cancel. The noise generated in the trigger output signal is also proportional to engine speed. If the trigger voltage level were fixed, the engine 11 would misfire when the noise levels reached the trigger threshold. The result is an engine timing that retards about 40° as the flywheel goes from 100 to 6,000 r.p.m.

Resistors R1, R2 and resistors R7, R8 form two voltage dividers that take a portion of the trigger coil bias and reverse bias the gates of the controlled rectifiers. This is done to increase RFI immunity. Only a portion of the trigger bias can be used because the reverse leakage current increases rapidly as the gate junctions of the controlled rectifiers SCR's go into breakdown. Capacitors C2, C4, C6, C7, C8 and C9 are all bypass capacitors that are used to suppress any RFI which might enter the circuit 35 and create a misfire.

Resistors R4, R5 and capacitor C3 form a pilot power supply for triggering controlled rectifiers SCR2 and SCR4. The values of resistors R4 and R5 must be high to prevent excessive bleeding of the main power capacitor C5, but small enough to allow ample voltage build up on capacitor C3 at high engine speed rates. Resistors R6 and R10 are used to limit the peak discharge current in the gates of controlled rectifiers SCR2 and SCR4. This circuit will deliver a short powerful current pulse to the proper controlled rectifier. This type of trigger pulse is necessary to prevent di/dt failure of the main power controlled rectifiers SCR's.

Diodes D4 and D9 serves as protection diode for controlled rectifiers SCR2 and SCR4, respectively. It has been found that with some ignition coil geometrics, a high voltage transient will appear across these controlled rectifiers. The diodes D4 and D9 clamp this transient to prevent controlled rectifier failure.

Diodes D3 and D4 are commonly termed free-wheeling output diodes and prevent the primary circuit of the ignition coils IC1 and IC2 from ringing, and thus sustain undirectional current flow in the primary winding for a longer period of time. The result is a longer secondary spark duration relative to the condition of the diodes not being in the circuit.

In the trigger circuitry itself, some of the commercially available pilot controlled rectifiers SCR's may not be within the fall-time specification and thereby the loss of triggering below 150 r.p.m. can occur. Increasing the value of capacitor C3 from 0.0047 µf to 0.01 µf and reducing resistor R4 from 3.3 M~ to 2.0 M~ allow an out-of specification part to perform satisfactorily.

We claim:

1. A breakerless capacitor discharge ignition system for an internal combustion engine, said ignition system comprising:
    (A) an ignition coil means;
    (B) a capacitor means for energizing said ignition coil means;
    (C) an alternator for providing electrical power pulses to said capacitor means and for producing electrical trigger pulses, said alternator including:
        (1) a rotor driven by said engine, said rotor having an inner cylindrical surface, an outer cylindrical surface, and a surface connecting said cylindrical surfaces, a first magnet means mounted on said outer surface, and a second magnet means mounted on said inner surface, said second magnet means including a first portion which is radially polarized with a first polarity, a second portion which is radially polarized with a second polarity opposite to said first polarity, and neutral zones therebetween; and
        (2) a stator assembly having a charging coil means cooperable with said first magnet means to produce said power pulses and a trigger coil means cooperable with said second magnet means to produce said trigger pulses, said trigger coil means including a core means forming a magnetic circuit from said second magnet means to said connecting surface and a trigger coil about a portion of said core means; and
    (D) a control circuit for receiving said trigger pulses and for effecting timed energization of said ignition coil means from said capacitor means.

2. The system defined in claim 1, wherein said first and second portions each extend approximately 180° about the center of said rotor.

3. The system defined in claim 2, wherein said first magnet means includes a pair of permanent magnets circumferentially spaced from each other and having neutral zones therebetween, said neutral zones of said first magnet means being radially aligned with the neutral zones of said second magnet means.

4. The system defined in claim 1, wherein the axis of said trigger coil is parallel to the axis of said rotor.

5. The system defined in claim 4, wherein said trigger coil means further includes a magnetic shield to shield said trigger coil from said first magnet means.

* * * * *